United States Patent
Rabello et al.

(10) Patent No.: US 12,531,481 B2
(45) Date of Patent: Jan. 20, 2026

(54) SYSTEMS AND METHODS TO REDUCE CABLE HEATING IN RADIO COMMUNICATIONS

(71) Applicant: Outdoor Wireless Networks LLC, Claremont, NC (US)

(72) Inventors: Jose Antonio Torres Rabello, Orland Park, IL (US); John T. Hanley, Orland Park, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 278 days.

(21) Appl. No.: 18/546,068

(22) PCT Filed: Feb. 14, 2022

(86) PCT No.: PCT/US2022/016321
§ 371 (c)(1),
(2) Date: Aug. 10, 2023

(87) PCT Pub. No.: WO2022/177857
PCT Pub. Date: Aug. 25, 2022

(65) Prior Publication Data
US 2024/0106326 A1 Mar. 28, 2024

Related U.S. Application Data

(60) Provisional application No. 63/149,740, filed on Feb. 16, 2021.

(51) Int. Cl.
*H02M 3/155* (2006.01)
*H02M 1/00* (2006.01)
*H02M 1/32* (2007.01)

(52) U.S. Cl.
CPC ......... *H02M 3/155* (2013.01); *H02M 1/0009* (2021.05); *H02M 1/327* (2021.05)

(58) Field of Classification Search
CPC ..... H02M 1/0009; H02M 1/327; H02M 3/155
(Continued)

(56) References Cited

U.S. PATENT DOCUMENTS 9,448,576 B2  9/2016  Chamberlain et al.
10,396,844 B2  8/2019  Coleman et al.
(Continued)

FOREIGN PATENT DOCUMENTS

JP  2002300118 A  10/2002
JP  6006251 B2  10/2016
(Continued)

OTHER PUBLICATIONS

U.S. Patent and Trademark Office, "Office Action", U.S. Appl. No. 18/546,072, dated Nov. 22, 2024, pp. 1 through 12, Published: US.
(Continued)

*Primary Examiner* — Yemane Mehari
(74) *Attorney, Agent, or Firm* — Fogg & Powers LLC (57) ABSTRACT

In one embodiment, a boosting system includes a booster circuit. The booster circuit is configured to receive a direct current (DC) voltage input and to adjust the DC voltage input. The boosting system further includes a current sensing circuit coupled to the booster circuit and a first end of a power cable. The current sensing circuit is configured to measure a current at the first end of the power cable. The boosting system further includes one or more processors coupled to the booster circuit and the current sensing circuit. The one or more processors are configured to adjust an output of the booster circuit when the current sensing circuit indicates that the current at the first end of the power cable exceeds a first threshold. The first threshold is selected at least in part based on one or more safety standards of the power cable.

20 Claims, 5 Drawing Sheets

(58) Field of Classification Search
USPC .......................................................... 323/282
See application file for complete search history.

(56) References Cited

U.S. PATENT DOCUMENTS

| | | | |
|---|---|---|---|
| 10,470,120 B2 | 11/2019 | Fischer | |
| 10,499,330 B2 | 12/2019 | Coleman et al. | |
| 10,812,664 B2 | 10/2020 | Kostakis et al. | |
| 11,129,095 B2 | 9/2021 | Gandhi | |
| 2013/0059554 A1 | 3/2013 | Ripley et al. | |
| 2013/0173186 A1 | 7/2013 | Lim et al. | |
| 2015/0009600 A1 | 1/2015 | Aromin et al. | |
| 2018/0164355 A1* | 6/2018 | Winkler | H04M 19/008 |
| 2018/0176861 A1 | 6/2018 | Chamberlain et al. | |
| 2018/0213091 A1 | 7/2018 | Kostakis et al. | |
| 2018/0275711 A1 | 9/2018 | Johnson et al. | |
| 2018/0335456 A1* | 11/2018 | Cook | G01R 21/1333 |
| 2019/0289541 A1* | 9/2019 | Fischer | H04W 52/346 |
| 2020/0358365 A1* | 11/2020 | Yuasa | H02M 1/34 |
| 2021/0144635 A1* | 5/2021 | Coleman | H02H 9/04 |
| 2024/0120834 A1 | 4/2024 | Hanley | |

FOREIGN PATENT DOCUMENTS

| | | |
|---|---|---|
| WO | 9958992 A2 | 11/1999 |
| WO | 2022177850 A1 | 8/2022 |
| WO | 2022177857 A1 | 8/2022 |

OTHER PUBLICATIONS

International Searching Authority, "International Search Report and Written Opinion", from PCT Application No. PCT/US2022/016300, Jun. 2, 2022, pp. 1 through 10, Published: WO.

International Searching Authority, "International Search Report and Written Opinion", from PCT Application No. PCT/US2022/016321, Jun. 2, 2022, pp. 1 through 9, Published: WO.

European Patent Office, "Extended European Search Report", dated Jan. 9, 2025, from EP Application No. 22756752.6, from Foreign Counterpart to U.S. Appl. No. 18/546,072, pp. 1 through 31, Published: EP.

U.S. Patent and Trademark Office, "Notice of Allowance", U.S. Appl. No. 18/546,072, dated Jan. 15, 2025, pp. 1 through 7, Published: US.

* cited by examiner

SYSTEMS AND METHODS TO REDUCE CABLE HEATING IN RADIO COMMUNICATIONS

CROSS REFERENCE TO RELATED APPLICATIONS

This application is related to U.S. patent application Ser. No. 63/149,747, filed Feb. 16, 2021, and titled "METHODS AND EQUIPMENT FOR REDUCING POWER LOSS IN RADIO SYSTEMS," the contents of which are incorporated herein by reference in its entirety. This application claims priority to International Patent Application No. PCT/US2022/016321, filed on Feb. 14, 2022, which claims the benefit of U.S. patent application Ser. No. 63/149,740, filed Feb. 16, 2021, and titled "SYSTEMS AND METHODS TO REDUCE CABLE HEATING IN RADIO COMMUNICATIONS," the contents of which are incorporated herein by reference in their entirety.

BACKGROUND

Demand for increased wireless communication has consequently increased the need for faster and more reliable communications technologies. Cellular communications are no exception: whereas traditional cellular communication systems installed both baseband and remote equipment at the bottom of a cell tower, contemporary systems now have the remote equipment installed at the top of a cell tower connected via a cable. In these systems, the cable delivers power to the remote equipment to enable the remote equipment to adequately function at the top of the tower.

Cell towers can vary widely in height, but sometimes extend more than two hundred feet tall. Demand for more sophisticated communications technology, such as 5G, has also resulted in a higher power demand for this remote equipment. As a result, these systems require cables having significant length and capacity to meet the power demands of the remote equipment at the top of the cell tower. Even with appropriately selected cables, the higher current drawn to support the remote equipment may exceed the safety standards for the cable. The excessive current may reach levels that cause overheating that can damage the power cable by melting of an insulator on the power cable, and potentially creating a short circuit which would result in diminished cell site reliability. Additionally, excess heat can increase the effective resistance of the power cable and thereby reduce its efficiency in delivering power to remote equipment.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a boosting system is provided. The boosting system includes a booster circuit, wherein the booster circuit is configured to receive a direct current (DC) voltage input and to adjust the DC voltage input to an adjusted DC voltage output. The boosting system further includes a current sensing circuit coupled to the booster circuit and a first end of a power cable. The current sensing circuit is configured to measure a current at the first end of the power cable. The boosting system further includes one or more processors coupled to the booster circuit and the current sensing circuit. The one or more processors are configured to adjust an output of the booster circuit when the current sensing circuit indicates that the current at the first end of the power cable exceeds a first threshold. The first threshold is selected at least in part based on one or more safety standards of the power cable.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In the description that follows, numerical references of a class, for example "first", "second", or "third" references to a class of thresholds, are meant only to distinguish between alternative members of the class and not meant to portray a concrete association to a particular example. Hence, a "first" threshold could be referenced as a "second" threshold elsewhere in the description, and vise-versa.

Furthermore, the terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

One technological barrier to implementing advanced communications technologies is the increased power burdens on existing equipment, particularly for power cables that deliver power from a power supply to remote equipment at the top of the cell tower. As the voltage drop across the cable increases, the current passing through the power cable increases and can heat up the cable. Left unchecked, the increased current could exceed the safety specifications for the cable and become a hazard for the cell tower and the equipment operating therein.

To make matters worse, cable integrity can be further damaged by environmental factors, such as the temperature and the environment surrounding the cable. For example, high temperature environments can increase heating of the cable beyond operational safety standards. Such conditions can be created naturally, by installing a power cable in a high temperature climate, or artificially, through electrical heating in a closed environment.

The techniques presented and described herein reduce or eliminate excess cable heating so that the cable can be operated safely even in advanced power-hungry systems or in high temperature environments. These techniques include a booster circuit configurable in a cellular communications system programmed to adjust a direct current (DC) voltage provided to the power cable, for example, by increasing the DC voltage provided at one end of the power cable. This in turn can reduce the current drawn by the power cable and thereby reduce the heat generated by the cable to deliver power to remote equipment. In this way, the system ensures that safety standards for the power cable are met, and the power cable is not compromised due to a high operating temperature.

DC voltage adjustment is made based on one or more safety standards of the power cable. In some embodiments, the booster circuit output is adjusted based on the current measured at the power cable; for instance, the booster circuit output is increased when the measured current rises above a threshold value. In other embodiments, the booster circuit output is adjusted based not directly on the measured current but rather the temperature (or other characteristic that is indicative of the temperature) of the power cable and/or the environment proximate to the power cable. Alternative embodiments implement a mix of the above-described embodiments by adjusting the voltage output based on both the measured current and temperature of the power cable, as will be described in further detail below.

Figure 1:
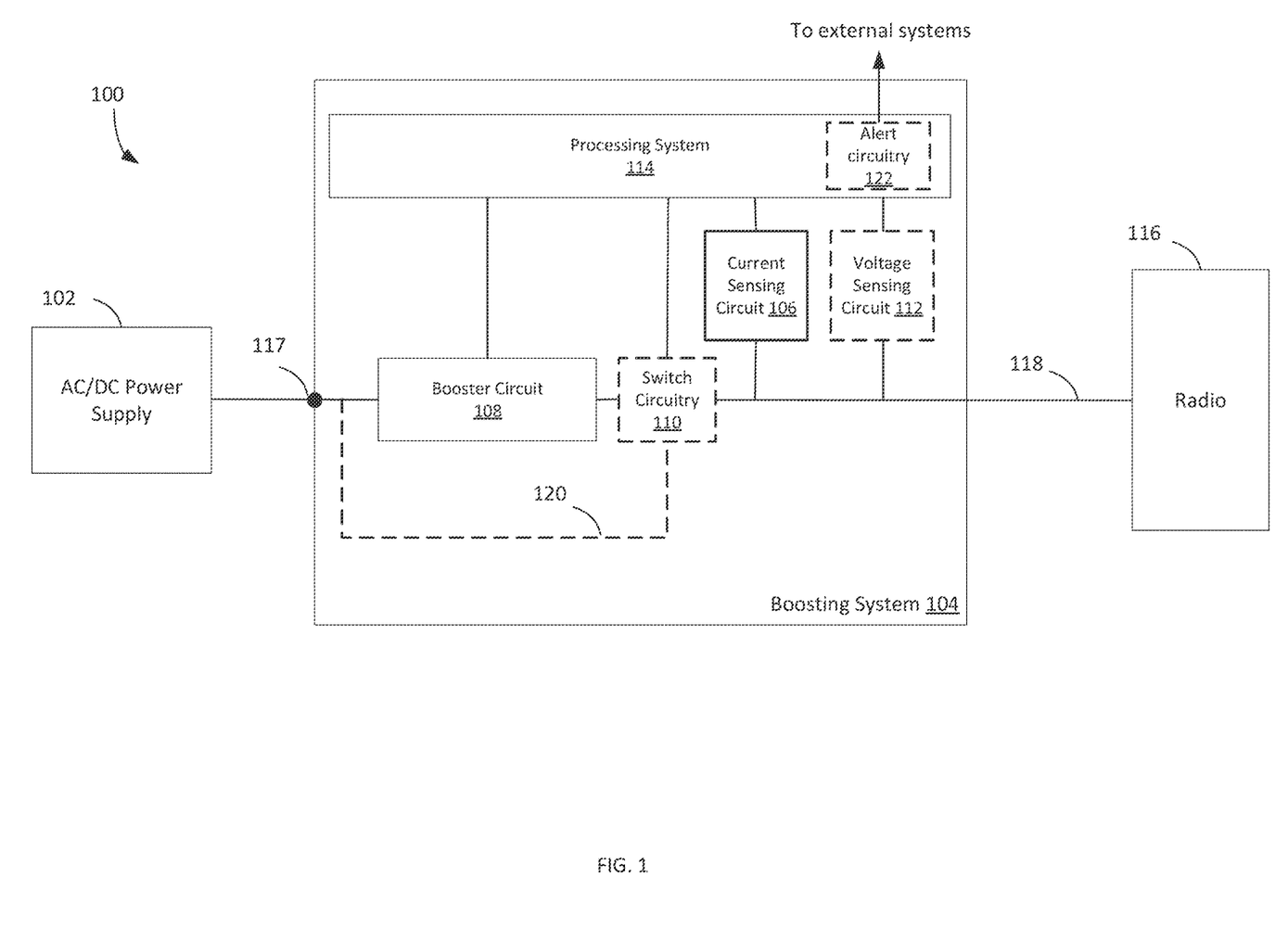
FIG. 1 illustrates a block diagram of a boosting system configured to adjust a voltage output to a power cable based on the current at the power cable to ensure safety standards for the power cable are met, according to an embodiment.

FIG. 1 illustrates an embodiment of a system 100 configured to safely provide DC power to remote equipment over a power cable. In this embodiment, system 100 delivers a DC voltage over power cable 118 to radio equipment 116. Among other things, system 100 includes a boosting system 104 configured to adjust a DC voltage output to one end of a power cable 118 based on the current, and optionally voltage, measured at the power cable 118.

Boosting system 104 receives DC voltage from AC/DC power supply 102 (alternatively referred to as a "rectifier"), in which AC/DC power supply 102 generates a DC voltage signal from a received alternating current (AC) input. For example, AC/DC power supply 102 can be configured to generate a −48 VDC signal received by boosting system 104. However, boosting system 104 may receive DC voltage through other power sources not shown in FIG. 1. For example, DC voltage can be provided via a backup battery or other alternative power source when the AC/DC power supply 102 fails to provide DC voltage or when turned off. Alternatively, boosting system 104 receives DC power from only a DC power supply.

Many cellular communications systems implement positive ground systems wherein the voltage supplied is defined as a negative voltage; that is, with reference to a ground defined as 0V. The ground signal may further be referenced as a "return" or "common" signal. When considering the DC voltage adjustment in system 100 and in other embodiments described herein, words such as a "higher DC voltage", "greater DC voltage", "increased DC voltage", or analogous terms, mean a DC voltage that has a greater absolute value from ground, regardless of whether the voltage supplied is positive or negative. This means that a DC voltage of +52 VDC is greater than a DC voltage of −40 VDC, but also that a voltage of −52 VDC is greater than a DC voltage of −40 VDC because the absolute value of −52 is greater than the absolute value of −40. DC voltage will be expressed as negative throughout the disclosure for pedagogical reasons understanding that positive values also fall within the scope of the disclosure.

The DC voltage input from the AC/DC power supply 102 is received by boosting system 104 at input 117, which is configured to transmit a DC voltage to a radio 116 coupled to the boosting system 104 via a power cable 118. Though FIG. 1 illustrates a power cable 118 as shown, power cable 118 can be quite long and in some embodiments is tens or hundreds of feet long. Additionally, more than one power cable 118 can be connected to boosting system 104 to provide power to multiple radios 116. For clarity in the Figures, only a single radio 116 is shown. A DC voltage is received at one end of power cable 118 from an output of boosting system 104, typically installed at the bottom of the cell tower. At another end of power cable 118 (e.g., at the top of the cell tower), a voltage is provided to one or more radios 116. However, a cell tower is described only in an exemplary fashion and is not required in system 100.

Radio 116 is configured to communicate radio frequency (RF) signals to one or more terminal devices, such as phones, tablets, computers, and other RF-compatible devices. For example, in the downlink direction (meaning the direction in which signals are processed from control equipment such as a base station or baseband unit to remote antenna equipment), radio 116 transmits RF signals to terminal devices. Conversely, in the uplink direction (the direction in which signals are processed from remote antenna equipment to control equipment), radio 116 receives RF signals from terminal devices and transmits them to control equipment over power cable 118. In some embodiments, radio 116 can form part of a radio distribution system, of which one example is a distributed antenna system, and can include a remote antenna unit (RAU), remote radio unit (RRU), or an active antenna unit (AAU).

As described above, boosting system 104 is configured to adjust the DC voltage provided to power cable 118 based on the current drawn by the power cable. In the embodiment shown in FIG. 1, boosting system 104 includes booster circuit 108, which receives DC voltage from AC/DC power supply 102 at input 117. Booster circuit 108 includes any suitable circuitry configured to adjust the received DC voltage to generate an adjusted DC voltage output. In some embodiments, booster circuit 108 can be an isolated or non-isolated DC-DC converter. Booster circuit 108 can also receive command signals via processing system 114 to activate or deactivate booster circuit 108 when needed. For example, when booster circuit 108 is activated, booster circuit 108 can amplify the DC voltage input received by AC/DC power supply 102 to a boosted DC voltage output. In some embodiments, the adjusted DC voltage can be a fixed predetermined value. For instance, booster circuit 108 can receive a DC voltage of −48 VDC and generate an adjusted DC voltage of −54 VDC; or, to put another way, booster circuit 108 provides an amplified 6 VDC increase to the DC voltage input. Such embodiments can be economically advantageous because they require less processing overhead to determine the appropriate voltage boost, thereby reducing the cost required to implement a boosting system.

In one embodiment, booster circuit 108 provides a variable adjusted DC voltage to power cable 118 dependent on the current and resistance of the power cable. For example, the resistance of power cable 118 can be measured or known a priori. Additionally, current sensing circuit 106 can be configured to measure the current drawn by power cable 118. Using conventionally known relationships between voltage, current, and resistance, booster circuit 108 can be configured to provide a boosted DC voltage that varies as the current and/or resistance of power cable 118 changes.

Boosting system 104 optionally includes switch circuitry 110, which can provide a simple mechanism for alternating between adjusted and non-adjusted outputs from booster circuit 108. As shown in system 100, boosting system 104 includes an optional bypass line 120 that can bypass the DC voltage from AC/DC power supply 102 to switch circuitry 110. This embodiment can be suitable when booster circuit 108 is in a constant active state (that is, booster circuit 108 continuously generates an adjusted DC voltage), since switch circuitry 110 can switch between the adjusted DC voltage and the nominal DC voltage received by AC/DC power supply 102. However, this configuration is optional because booster circuit 108 can be configured in other ways as well. For example, processing system 114 can be configured to activate and deactivate booster circuit 108. In this case, the bypass line 120 and switch circuitry 110 may not be necessary since booster circuit 108 can be configured to pass through the DC voltage from AC/DC power supply 102 when deactivated, and generate an adjusted DC voltage once activated.

A "nominal" voltage refers to a voltage corresponding to the input voltage received by boosting system 104 from a power source. A nominal voltage output (e.g. output to power cable 118 from boosting system 104) may include the input voltage or a processed output representing the input voltage, such as an output that is filtered, but does not include a boosted DC output from booster circuit 108. In some embodiments, though, it may include an un-adjusted (e.g., un-boosted) output from booster circuit 108 (for example, if booster circuit 108 is deactivated as described below).

When implemented, switch circuitry 110 is configured to switch between a first and second configuration corresponding to control signals received by processing system 114. In the first configuration, switch circuitry 110 is configured to output the nominal DC voltage received from AC/DC power supply 102. Conversely, switch circuitry 110 is configured to output the adjusted DC voltage from booster circuit 108 in the second configuration. Switch circuitry 110 includes any suitable switches and switching circuitry or combination thereof configured to switch between the first and second configurations. This may include (but not limited to): single pole single throw (SPST), single pole double throw (SPDT), and double pole double throw (DPDT) switches, field effect transistor (FET) switches and other transistors, switch arrays, diodes, and other such circuitry.

A current sensing circuit 106 is coupled to the output of switch circuitry 110. Current sensing circuit 106 is configured to sense (e.g., measure) the current at the output of boosting system 104 connected to a first end of power cable 118. Current sensing circuit 106 includes appropriate circuitry to perform this function, such as an ammeter. In various embodiments, the current sensing circuit 106 can be an independent circuit or can be included in processing system 114.

Also shown in FIG. 1, boosting system 104 further includes processing system 114. Processing system 114 is coupled to or includes current sensing circuit 106, and can be further coupled to booster circuit 108, switch circuitry 110, and an optional voltage sensing circuit 112 as described below. Processing system 114 may include any one or combination of processors, microprocessors, digital signal processors, application specific integrated circuits, field programmable gate arrays, and/or other similar variants thereof. Processing system 114 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures, and can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. The memory may also include one or more databases to store acquired data.

When processing system 114 receives current measurements from current sensing circuit 106, it can configure boosting system 104 to output either the nominal DC voltage or an adjusted DC voltage generated by booster circuit 108 to power cable 118. For example, in an embodiment processing system 114 compares the measured current to a threshold value. If the measured current exceeds the threshold value (that is, the current of power cable 118 is too high), then processing system 114 can configure boosting system 104 to output a boosted DC voltage to power cable 118 to reduce the current drawn and consequently reduce excess heating. If the measured current does not exceed the threshold value (which would correlate to the current drawn by power cable 118 meeting acceptable criteria), then processing system 114 configures boosting system 104 to output the nominal DC voltage to power cable 118. In some embodiments, processing system 114 configures booster circuit 108 to boost the input voltage even when the current does not exceed the threshold to provide boosted voltage to radio 116 when needed to meet other requirements or based on other conditions of the system 100.

The threshold value is selected based on one or more safety standards of power cable 118. In some embodiments, the threshold value should be selected to preemptively protect power cable 118 from damage caused by excessive current loads. In some embodiments, the threshold is selected to be within a certain percentage of a maximum current safety rating of the power cable. The current threshold can be set either in the factory or in the field, in which boosting system 104 provides an alarm if the threshold is exceeded. In some embodiments, processing system 114 compares the measured current to multiple thresholds to avoid over-frequent switching. For example, processing system 114 can compare the current to a first threshold and configure boosting system 104 to output an adjusted DC voltage when the current exceeds a first threshold. Then, processing system 114 compares the current to a second threshold and provides the nominal DC voltage when the current falls below the second threshold. The first and second thresholds can be separated by a hysteresis width.

When processing system 114 determines that the current drawn by power cable 118 is too high (e.g., it exceeds the threshold value), processing system 114 can configure switch circuitry 110 to the second configuration so that switch circuitry 110 can output the adjusted DC voltage to power cable 118. Alternatively, if processing system 114 determines that the current drawn by power cable 118 is too low, it can configure switch circuitry 110 back to the first configuration so that switch circuitry 110 can output the nominal DC voltage to power cable 118.

Additionally, or alternatively, in other embodiments, processing system 114 is configured to activate or deactivate booster circuit 108 based on the current drawn by power cable 118. When the current exceeds a threshold processing system 114 activates booster circuit 108, which generates a boosted DC voltage output to power cable 118. Conversely, processing system 114 deactivates booster circuit 108 when the current measured at power cable 118 is below the threshold.

Boosting system 104 optionally includes voltage sensing circuit 112, which is configured to measure the voltage provided to power cable 118. Voltage sensing circuit 112 includes appropriate circuitry to perform this function, such as a potentiometer. Similar to current sensing circuit 106 described above, voltage sensing circuit 112 can be an independent circuit, can be combined with current sensing circuit 106, or can be immersed with processing system 114. Although not shown in FIG. 1, voltage sensing circuit 112 can alternatively be placed near the second end of power cable 118 to measure the voltage near radio 116.

In some embodiments, processing system 114 adjusts the DC voltage output based on both the current drawn by power cable 118 and the voltage applied to the power cable. This advantageously allows boosting system 104 to boost the voltage provided to power cable 118 while also preventing the boosted voltage from exceeding acceptable voltage parameters of power cable 118 and/or radio 116. For example, current sensing circuit 106 measures the current of power cable 118 and processing system 114 determines whether the current exceeds a threshold value. As described above, this would trigger booster circuit 108 to output a boosted DC voltage to power cable 118. However, in some embodiments processing system 114 then determines whether the boosted DC voltage would be acceptable to deliver to power cable 118 and/or radio 116; that is, whether the boosted DC voltage would be within operational voltage limits of power cable 118 and/or radio 116. One example would be to compare the measured voltage to another threshold. If the measured voltage is below the threshold, pedagogically referred to as a "second" threshold, then processing system 114 determines that the voltage is acceptable to deliver to power cable 118 and/or radio 116. Like above, the second threshold can be divided into a "third" and "fourth" threshold to account for hysteresis noise.

The voltage threshold(s) can be selected based on the specifications of either power cable 118, radio 116, or both. In some embodiments, the threshold is selected based on the maximum voltage load handled by power cable 118 or radio 116 but can be based on other criteria as well.

When processing system 114 determines that the boosted DC voltage is too high to deliver to power cable 118 (e.g., the boosted DC voltage exceeds the second threshold), it can take a variety of actions in response. In one example, processing system 114 reconfigures booster circuit 108 to generate a reduced boosted DC voltage, which it can then compare to the second threshold to see if the reduced boosted DC voltage is below the threshold value. For booster circuits configured to provide only a fixed boosted voltage, this may not be possible. In another embodiment, processing system 114 includes alert circuitry 122 configured to send alerts to external systems warning that (1) power cable 118 is drawing excess levels of current; and/or (2) boosting system 104 is unable to reduce current levels because current voltage boosting parameters set by boosting system 104 would generate a boosted DC voltage that exceeds operational or recommended DC voltage levels of power cable 118 and/or radio 116. Such alerts can also be sent to a network operator through a human-machine interface. If no other recourse is available to provide an adjusted DC voltage suitable for power cable 118 and/or radio 116, processing system 114 (or another processing system) is configured to temporarily disable components in system 100, such as AC/DC power supply 102, radio 116, or both until operational conditions can be restored.

Figure 2:
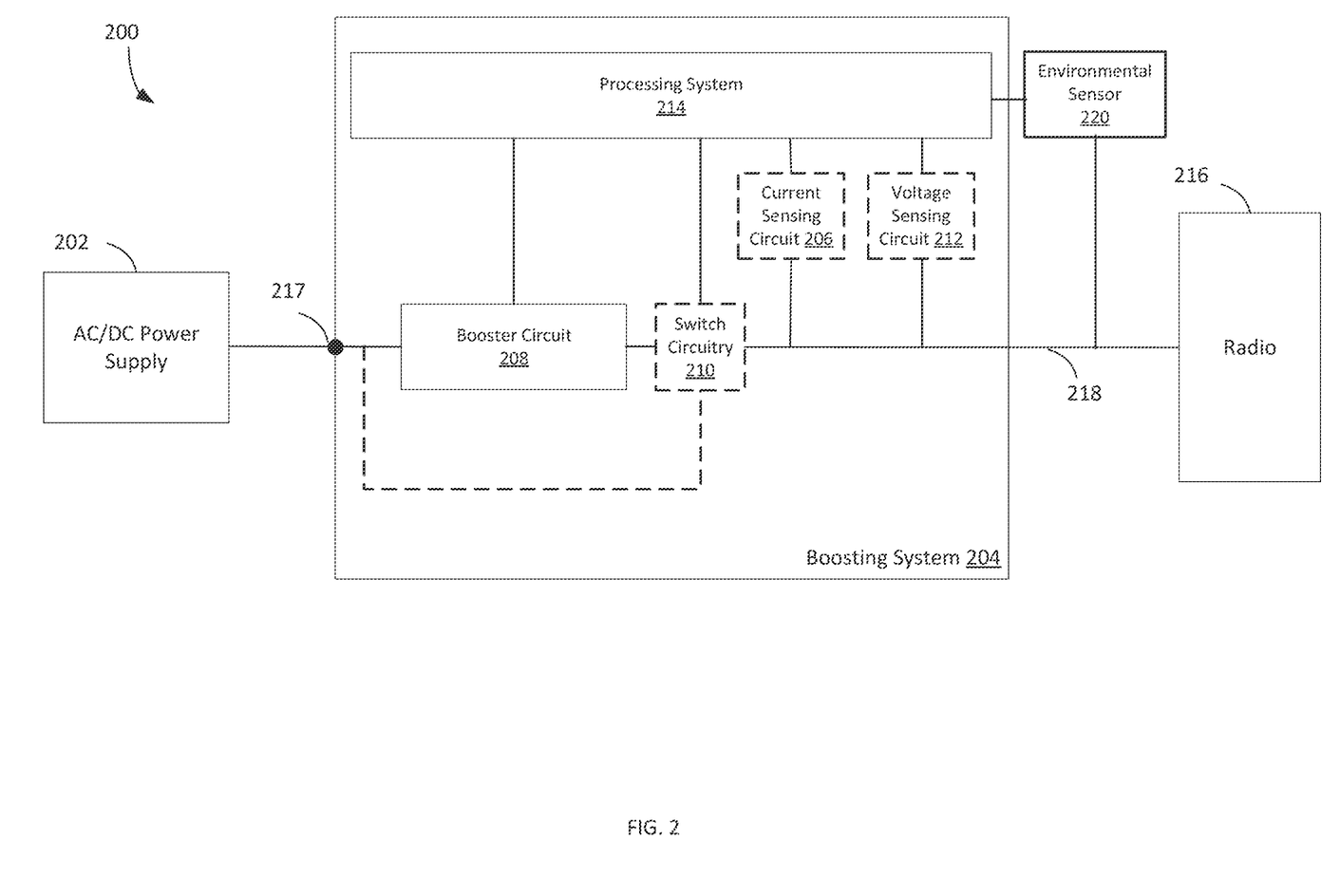
FIG. 2 illustrates a block diagram of a boosting system configured to adjust a voltage output to a power cable based on the temperature proximate to the power cable to ensure that the temperature of the power cable does not exceed a safe operating level, according to an embodiment.

FIG. 2 illustrates an alternative embodiment of a system 200 including a boosting system 204 configured to reduce excess power cable heating. Similar to system 100, system 200 includes an AC/DC power supply 202, booster circuit 208 coupled to a processing system 214, and a radio 216. Boosting system 204 is configured to receive DC voltage from AC/DC power supply 202 at input 217. Boosting system 204 optionally includes switch circuitry 210, current sensing circuit 206, and voltage sensing circuit 212. At a general level, system 200 functions similarly to system 100.

System 200 differs from system 100, however, in that it includes an environmental sensor 220 coupled to (or included in) boosting system 204.

Environmental sensor 220 is configured to measure environmental operating parameters of power cable 218 or an environment proximate to power cable 218. For example, environmental sensor 220 can be installed near power cable 218 or embedded thereon. The environmental operating parameters can include parameters such as temperature, effective resistance, heat flow distribution, thermal conductivity, and other parameters relevant to power cable heating. For pedagogical reasons, temperature is described below as an exemplary parameter.

The temperature measurements acquired by environmental sensor 220 are sent to processing system 214. Processing system 214 is configured to determine whether the DC voltage received from boosting system 204 should be adjusted based on the temperature of power cable 218. In an embodiment, processing system 214 compares the temperature measurements to a threshold value based on the safety standards of power cable 218. If the measured temperature exceeds a selected temperature threshold, then processing system 214 determines that power cable 218 is overheating. Accordingly, to reduce excess heat in power cable 218, processing system 214 configures booster circuit 208 to adjust the DC voltage output. In one embodiment, processing system 214 configures booster circuit 208 to boost the DC voltage output to power cable 218 to reduce the current drawn by power cable 218 and hence reduce the heat attributable to power loss. If the measured temperature is not greater than the temperature threshold, then boosting system 204 does not output an adjusted DC voltage to power cable 218.

The temperature thresholds can be selected based on the safety standards of power cable 218 as well as routine temperature conditions in which power cable 218 (or system 200 more generally) is installed. For example, if power cable 218 is installed in a high-temperature environment, then the threshold should be lower than if power cable 218 is installed in a more temperate or moderate environment. Of course, the specifications and material composition of power cable 218 can also be considered in determining a threshold to protect against excess cable heating. For example, the threshold can be determined based on one or more heating properties of the power cable, such as the cable's thermal conductivity and maximum operating temperature to avoid damage to the power cable from overheating. In some embodiments, the temperature thresholds can be selected based on a maximum temperature rating or percentage rating of the power cable. If the maximum rated temperature is 50 degrees Celsius, for example, then the threshold can be selected to a value that is 95% of the maximum temperature. Multiple thresholds can also be selected to reduce hysteresis noise similarly as described with respect to voltage and current thresholds.

In some exemplary embodiments, temperature is but one of several operating parameters considered by processing system 214 in determining whether to output an adjusted DC voltage. For example, boosting system 204 optionally includes current sensing circuit 206 configured to measure the current drawn by power cable 218. Thus, processing system 214 considers the temperature of power cable 218 in tandem with the current drawn by the power cable, such as by boosting the DC voltage when the temperature exceeds a temperature threshold and the current exceeds a current threshold. Alternatively, processing system 214 considers temperature along with the voltage at power cable 218, which is measured by voltage sensing circuit 212. That is, boosting system 204 outputs a boosted DC voltage when the temperature exceeds the temperature threshold and the voltage does not exceed a voltage threshold. And in additional embodiments, processing system 214 considers temperature along with both voltage and current of power cable 218, consistent with the principles described above and as further described in FIG. 5.

Figure 3:
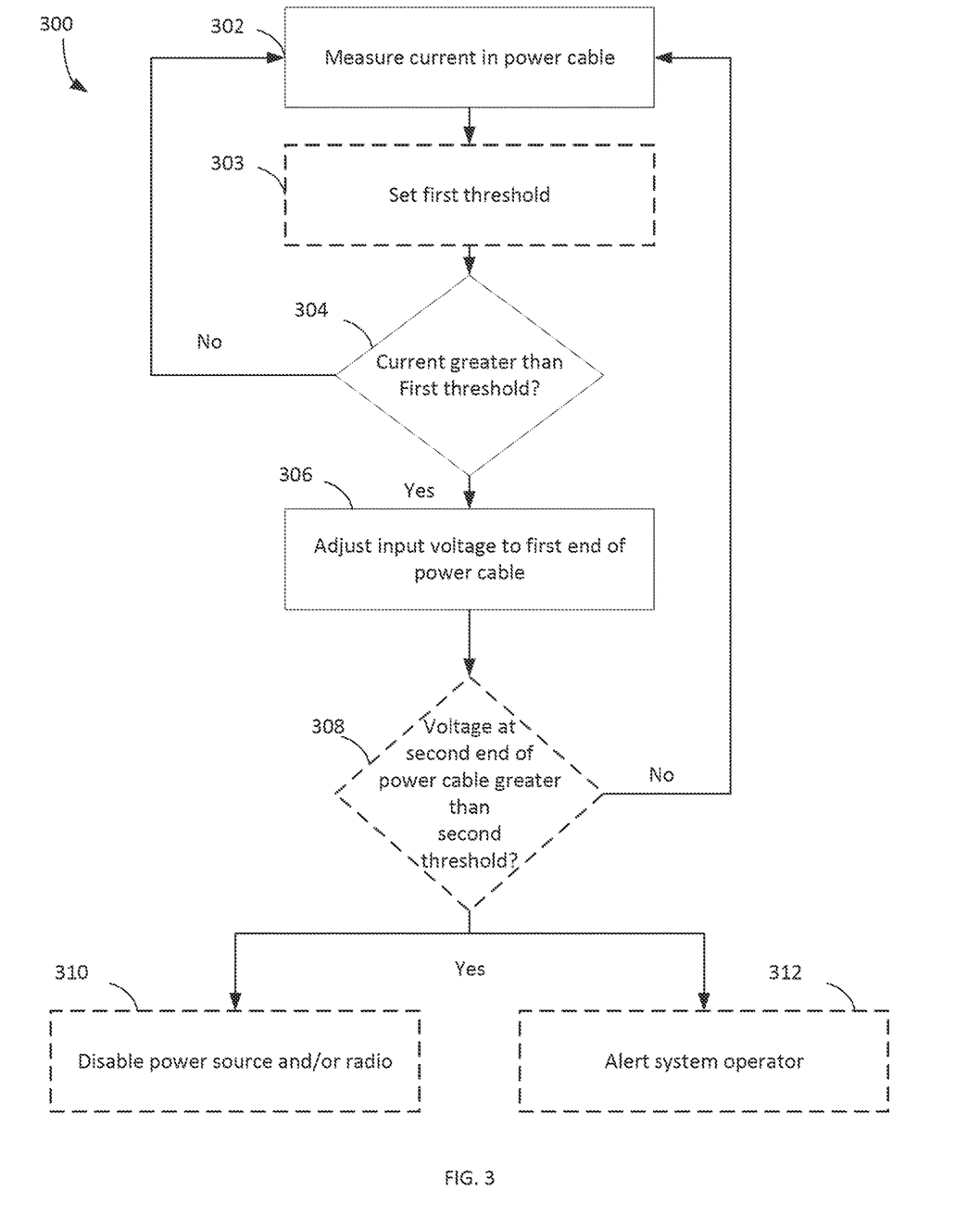
FIG. 3 illustrates a flow diagram of a method for ensuring a safe operating parameter for a power cable by adjusting an input voltage to a first end of the power cable based on the current at the power cable, according to an embodiment.

FIG. 3 illustrates a flow diagram of a method 300 for ensuring a safe operating parameter, e.g., temperature or heating, of a power cable in a cellular communications system. Method 300 may be implemented via the techniques described with respect to FIGS. 1-2, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 300 begins at block 302 by measuring a current in a power cable. At block 303, method 300 optionally proceeds by setting a first threshold value. The first threshold is a current threshold that can be set a variety of ways. In an embodiment, the current threshold is set manually by a user (e.g. technician) through user input. In some embodiments, the current threshold is initially programmed during production in the factory and may be readjusted after installation in a particular environment. The first threshold is also selected based on one or more safety standards of the power cable. For example, the first threshold can be determined based on a maximum current that can be drawn by the power cable without overheating it or causing electrical damage.

Proceeding to block 304, method 300 determines whether the measured current is greater than the first threshold e.g., within a certain percentage of a maximum current safety rating of the power cable, such as 95%. If the measured current is not greater, then the power cable is likely not overheating and method 300 can revert back to block 302 to continuously measure the current in the power cable.

But, if the current is greater than the first threshold, then method 300 proceeds to block 306 by adjusting an input voltage provided to a first end of the power cable. In some embodiments, adjusting the input voltage includes generating a boost voltage to the power cable to reduce excess cable heating attributable to excess current drawn by the power cable. The input voltage can be boosted by a fixed, predetermined DC voltage, or can be dynamically adjusted based on the resistance and current of the power cable.

Optionally, method 300 can proceed to block 308, in which it measures a voltage at a second end of the power cable and determines whether the measured voltage is greater than a second (voltage) threshold, which can be selected based on the specifications of the power cable and/or a radio connected to the power cable at the second end. If not, then method 300 determines that the adjusted input voltage meets operational safety standards and that the voltage can be boosted and provided to the power cable without damaging the power cable. Method 300 then reverts back to block 302 by measuring the current in the power cable at a later time period.

If method 300 determines that voltage at the second end of the power cable is greater than the second threshold, then method 300 proceeds to either block 310 or block 312. In block 310, method 300 disables the power source providing voltage to the power cable. The radio coupled to the power cable can also be temporarily disabled to protect it from damage until environmental or internal conditions change. At block 312 method 300 also alerts a system operator about the potentially high voltage provided to the power cable. In response, the system operator can reconfigure the radio to reduce the power consumption of the radio system.

Figure 4:
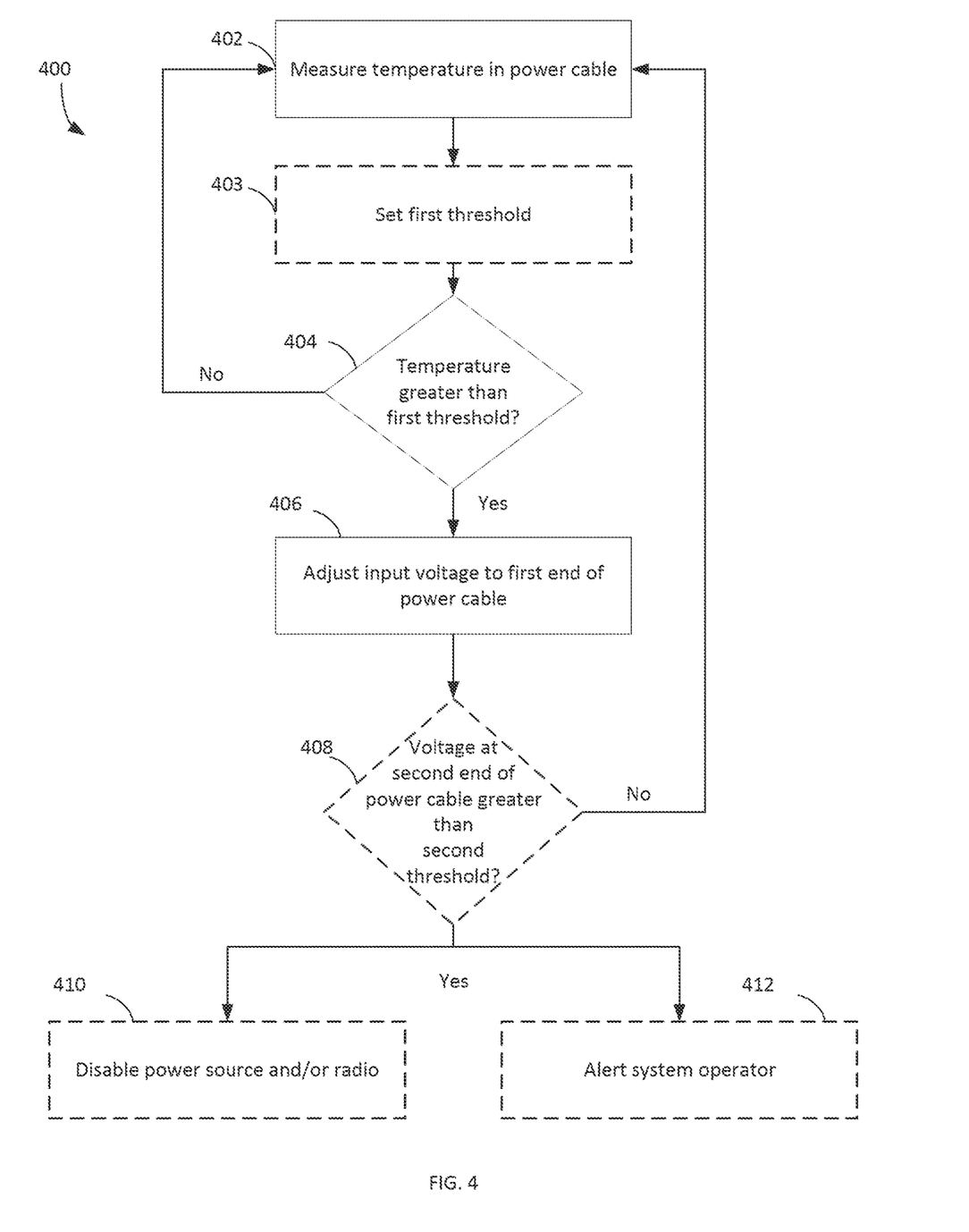
FIG. 4 illustrates a flow diagram of a method for ensuring a safe operating temperature for a power cable by adjusting an input voltage to a first end of a power cable based on a sensed temperature of the power cable, according to an embodiment.

Referring to FIG. 4, another embodiment of a method for ensuring a safe operating temperature (parameter) of a power cable is illustrated. Method 400 operates similarly to method 300 and like method 300 may be implemented using the techniques described with respect to FIGS. 1-2.

Method 400 begins at block 402 by measuring a temperature in the power cable or an environment surrounding or proximate to the power cable. At block 403, method 400 optionally proceeds by setting a first threshold value. The first threshold is an environmental operating parameter (e.g. temperature) threshold that can be set a variety of ways. In an embodiment, the threshold is set manually by a user (e.g. technician) through user input. In some embodiments, the threshold is initially programmed during production in the factory and may be readjusted after installation in a particular environment. The first threshold is selected based on one or more safety standards of the power cable. For example, the first threshold can be determined based on heating properties of the power cable, such as the cable's thermal conductivity and maximum operating temperature to avoid damage to the power cable from overheating.

At block 404, method proceeds by determining whether the measured temperature is greater than a first threshold based on the safety standards for the power cable, e.g., within a certain percentage of a maximum temperature safety rating of the power cable. If not, then the measured temperature is adequate for operation of the power cable, and method 400 reverts back to block 402 to continue measuring temperature in the power cable.

When the measured temperature exceeds the first threshold, method 400 proceeds to block 406 by adjusting an input voltage to the first end of the power cable so that safety standards for the power cable are not exceeded. In some embodiments, this means method 400 generates a boost voltage greater than the input voltage to the power cable to reduce the current drawn by the power cable and hence reduce the heat generated. Optionally, method 400 considers the voltage by determining whether the adjusted voltage at a second end of the power cable is greater than a second threshold at block 408. If it is not greater, then method 400 reverts back to block 402 and continues to monitor the temperature of the power cable.

When the voltage at the second end of the power cable is greater than the second threshold, method 400 can proceed to blocks 410 and/or 412 and take actions similar to those described above with respect to FIG. 3.

Figure 5:
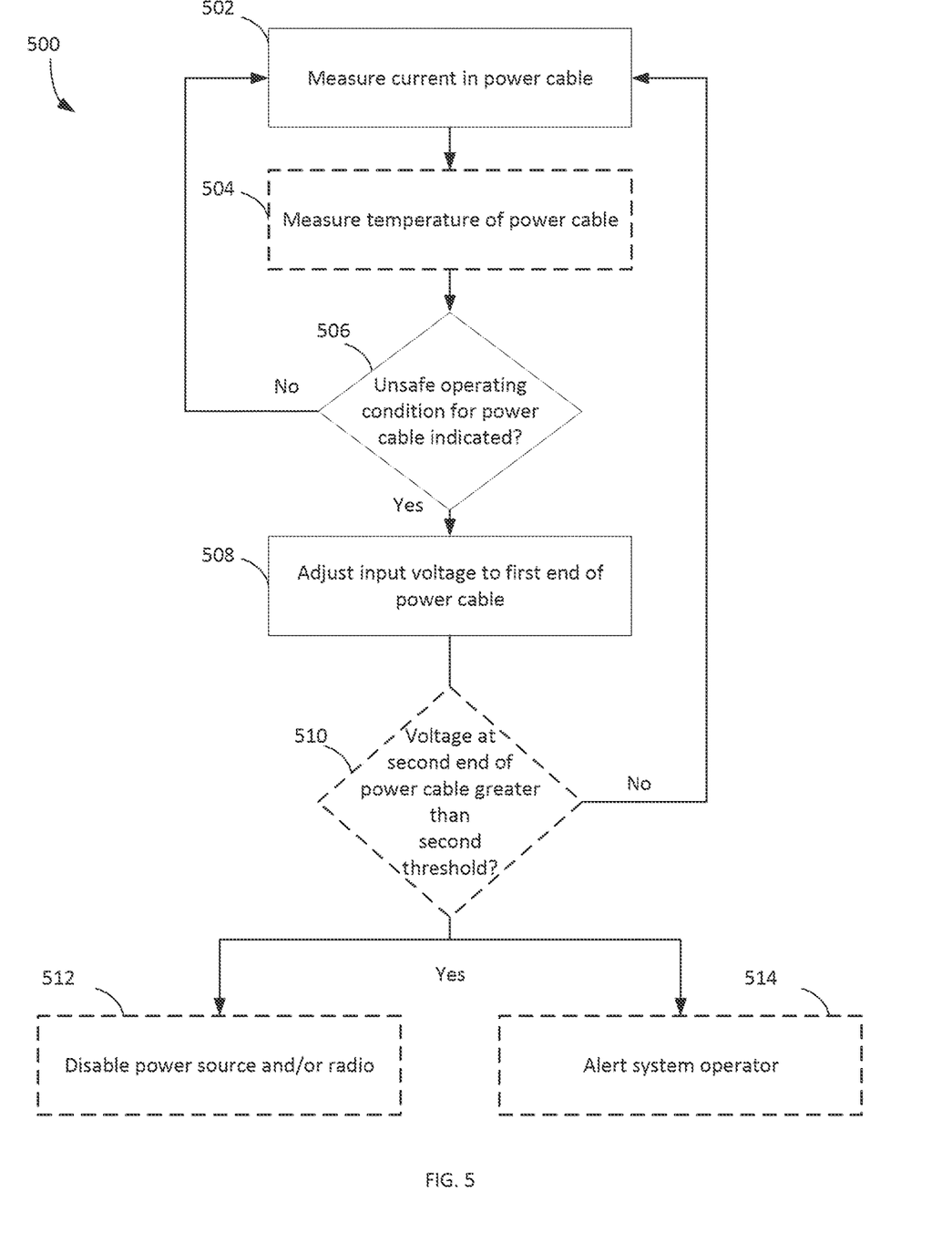
FIG. 5 illustrates a flow diagram of a method for ensuring a safe operating parameter for a power cable by adjusting an input voltage to a first end of a power cable based on one or more safety standards of the power cable, according to an embodiment.

FIG. 5 describes in another embodiment a method 500 for ensuring safe operating conditions for a power cable. Method 500 operates similarly to the methods described in FIGS. 3-4 except that method 500 considers operating parameters e.g. current, temperature, and voltage of the power cable. Like FIGS. 3-4, method 500 may be implemented using the techniques described with respect to FIGS. 1-2 but may be implemented using other techniques as well.

Method 500 begins at block 502 by measuring a current in the power cable. Optionally, method 500 also measures the temperature of the power cable at block 504. At block 506, method 500 proceeds by determining whether the measured current and/or temperature indicate an unsafe operating parameter for the power cable. In some embodiments, method 500 proceeds to block 508 when both the current and temperature measurements exceed a threshold (i.e. the measured current exceeds a current threshold and the measured temperature exceeds a temperature threshold). In other embodiments, method 500 proceeds to block 508 when at least one of the current and the temperature exceeds a threshold value (e.g. the measured current exceeds a current threshold or the measured temperature exceeds a temperature threshold). If one or more of the current or temperature does not exceed the threshold, then block 506 can revert back to block 502 and measure the current and optionally temperature of the power cable.

If the current and/or temperature is greater than the threshold, then at block 508 method 500 adjusts the input voltage to a first end of the power cable as described above. Optionally, method 500 proceeds to block 510 by determining that the voltage at a second end of the power cable is greater than a second threshold. If it does, then method 500 can proceed to block 512 and/or block 514 and take similar actions to those described above with respect to FIG. 3.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application specific integrated circuits (ASICs).

EXAMPLE EMBODIMENTS

Example 1 includes a boosting system, comprising: a booster circuit, wherein the booster circuit is configured to receive a direct current (DC) voltage input and to adjust the DC voltage input to an adjusted DC voltage output; a current sensing circuit coupled to the booster circuit and a first end of a power cable, wherein the current sensing circuit is configured to measure a current at the first end of the power cable; and one or more processors coupled to the booster circuit and the current sensing circuit, wherein the one or more processors are configured to adjust an output of the booster circuit when the current sensing circuit indicates that the current at the first end of the power cable exceeds a first threshold, wherein the first threshold is selected at least in part based on one or more safety standards of the power cable.

Example 2 includes the boosting system of Example 1, further comprising switch circuitry coupled to the booster circuit and the one or more processors, wherein one or more processors are configured to configure the switch circuitry in a first or second configuration, wherein in the first configuration the switch circuitry is configured to output the DC voltage input from an alternating current/direct current (AC/DC) power supply to the first end of the power cable; and wherein in the second configuration the switch circuitry is configured to output the adjusted DC voltage output from the booster circuit to the first end of the power cable.

Example 3 includes the boosting system of any of Examples 1-2, further comprising an environmental sensor coupled to the power cable and the one or more processors, wherein the environmental sensor is configured to measure a temperature of the power cable, and wherein the one or more processors are configured to adjust the output of the booster circuit based on the current at the first end of the power cable and the temperature.

Example 4 includes the boosting system of any of Examples 1-3, wherein the booster circuit adjusts the DC voltage input by boosting the DC voltage input to a level that reduces the current at the first end of the power cable to be below the first threshold.

Example 5 includes the boosting system of any of Examples 1-4, wherein the booster circuit adjusts the DC voltage input by boosting the DC voltage input based on the current and a resistance of the power cable.

Example 6 includes the boosting system of any of Examples 1-5, further comprising a voltage sensing circuit coupled to the booster circuit and the one or more processors, wherein the voltage sensing circuit is configured to measure the adjusted DC voltage output, and wherein the one or more processors are configured to deactivate the booster circuit when the adjusted DC voltage output exceeds a second threshold.

Example 7 includes the boosting system of Example 6, wherein the second threshold is based on a safety voltage standard of at least one of the power cable and a radio coupled to the power cable.

Example 8 includes a boosting system, comprising: a booster circuit, wherein the booster circuit is configured to receive a direct current (DC) voltage input and to adjust the DC voltage input to an adjusted DC voltage output; an environmental sensor configured to be coupled to the booster circuit and a power cable, wherein the environmental sensor is configured to measure a temperature at the power cable; and one or more processors coupled to the booster circuit and the environmental sensor, wherein the one or more processors are configured to adjust an output of the booster circuit when the environmental sensor indicates that the temperature at the first end of the power cable exceeds a first threshold, wherein the first threshold is selected at least in part based on one or more safety standards of the power cable.

Example 9 includes the boosting system of Example 8, further comprising switch circuitry coupled to the booster circuit and the one or more processors, wherein one or more processors are configured to configure the switch circuitry in a first or second configuration, wherein in the first configuration the switch circuitry is configured to output the DC voltage input from an alternating current/direct current (AC/DC) power supply to a first end of the power cable; and wherein in the second configuration the switch circuitry is configured to output the adjusted DC voltage output from the booster circuit to the first end of the power cable.

Example 10 includes the boosting system of any of Examples 8-9, wherein the booster circuit adjusts the DC voltage input by boosting the DC voltage input to a level that reduces a current at a first end of the power cable to be below the first threshold.

Example 11 includes the boosting system of any of Examples 8-10, wherein the booster circuit adjusts the DC voltage input by boosting the DC voltage input based on a current and a resistance of the power cable.

Example 12 includes the boosting system of any of Examples 8-11, further comprising a voltage sensing circuit coupled to the booster circuit and the one or more processors, wherein the voltage sensing circuit is configured to measure the adjusted DC voltage output, and wherein the one or more processors are configured to deactivate the booster circuit when the adjusted DC voltage output exceeds a second threshold.

Example 13 includes the boosting system of Example 12, wherein the second threshold is based on a safety voltage standard of at least one of the power cable and a radio coupled to the power cable.

Example 14 includes a method, comprising: measuring a current at a first end of a power cable; determining whether the current at the first end of the power cable is greater than a first threshold; and generating an adjusted direct current (DC) voltage configured to be provided to the power cable when the current at the first end of the power cable exceeds the first threshold based on a safety standard of the power cable, wherein the first threshold is selected at least in part based on one or more safety standards of the power cable.

Example 15 includes the method of Example 14, wherein generating an adjusted DC voltage further comprises increasing the DC voltage input to the power cable.

Example 16 includes the method of any of Examples 14-15, further comprising providing a DC voltage output based on the adjusted DC voltage input to the power cable.

Example 17 includes the method of Example 14-16, further comprising sending an alert to one or more systems when the adjusted DC voltage is greater than the second threshold.

Example 18 includes the method of any of Examples 14-17, wherein generating an adjusted DC voltage further comprises adjusting the DC voltage based on a temperature of the power cable.

Example 19 includes the method of any of Examples 14-18, wherein determining whether the current is greater than a first threshold further comprises determining whether the current is within a percentage of a maximum temperature safety rating of the power cable.

Example 20 includes the method of any of Examples 17-19, wherein determining whether the adjusted DC voltage is greater than a second threshold further comprises determining whether the adjusted DC voltage is greater than a safety voltage standard of at least one of the power cable and a radio coupled to the power cable.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A boosting system, comprising:
   a booster circuit, wherein the booster circuit is configured to receive a direct current (DC) voltage input and to adjust the DC voltage input to an adjusted DC voltage output;
   a current sensing circuit coupled to the booster circuit and configured to measure a current flowing through a power cable; and
   one or more processors coupled to the booster circuit and the current sensing circuit, wherein the one or more processors are configured to adjust a DC voltage output of the booster circuit when the measured current exceeds a first threshold, wherein the first threshold is selected at least in part based on one or more safety standards of the power cable.

2. The boosting system of claim 1, further comprising switch circuitry coupled to the booster circuit and the one or more processors, wherein one or more processors are configured to configure the switch circuitry in a first or a second configuration, wherein in the first configuration the switch circuitry is configured to output the DC voltage input from an alternating current/direct current (AC/DC) power supply to the power cable; and wherein in the second configuration the switch circuitry is configured to output the adjusted DC voltage output from the booster circuit to the power cable.

3. The boosting system of claim 1, further comprising an environmental sensor coupled to the power cable and the one or more processors, wherein the environmental sensor is configured to measure a temperature of the power cable, and wherein the one or more processors are configured to adjust the output of the booster circuit based on the measured current and the temperature.

4. The boosting system of claim 1, wherein the booster circuit is configured to adjust the DC voltage input by boosting the DC voltage input to a level that reduces the current flowing through the power cable to be below the first threshold.

5. The boosting system of claim 1, wherein the booster circuit is configured to adjust the DC voltage input by boosting the DC voltage input based on the measured current and a resistance of the power cable.

6. The boosting system of claim 1, further comprising a voltage sensing circuit coupled to the booster circuit and the one or more processors, wherein the voltage sensing circuit is configured to measure the adjusted DC voltage output, and wherein the one or more processors are configured to deactivate the booster circuit when the adjusted DC voltage output exceeds a second threshold.

7. The boosting system of claim 6, wherein the second threshold is based on a safety voltage standard of at least one of the power cable and a radio coupled to the power cable.

8. A boosting system, comprising:
   a booster circuit, wherein the booster circuit is configured to receive a direct current (DC) voltage input and to adjust the DC voltage input to an adjusted DC voltage output;
   an environmental sensor configured to be coupled to the booster circuit and configured to be coupled to a power cable, wherein the environmental sensor is configured to measure a temperature at the power cable; and
   one or more processors coupled to the booster circuit and the environmental sensor, wherein the one or more processors are configured to adjust a DC voltage output by the booster circuit when the measured temperature exceeds a first threshold, wherein the first threshold is selected at least in part based on one or more safety standards of the power cable.

9. The boosting system of claim 8, further comprising switch circuitry coupled to the booster circuit and the one or more processors, wherein one or more processors are configured to configure the switch circuitry in a first or a second configuration, wherein in the first configuration the switch circuitry is configured to output the DC voltage input from an alternating current/direct current (AC/DC) power supply to the power cable; and wherein in the second configuration the switch circuitry is configured to output the adjusted DC voltage output from the booster circuit to the power cable.

10. The boosting system of claim 8, wherein the booster circuit is configured to adjust the DC voltage input by boosting the DC voltage input to a level that reduces a current flowing through the power cable to be below the first threshold.

11. The boosting system of claim 8, wherein the booster circuit is configured to adjust the DC voltage input by boosting the DC voltage input based on a current flowing through and a resistance of the power cable.

12. The boosting system of claim 8, further comprising a voltage sensing circuit coupled to the booster circuit and the one or more processors, wherein the voltage sensing circuit is configured to measure the adjusted DC voltage output, and wherein the one or more processors are configured to deactivate the booster circuit when the adjusted DC voltage output exceeds a second threshold.

13. The boosting system of claim 12, wherein the second threshold is based on a safety voltage standard of at least one of the power cable and a radio coupled to the power cable.

14. A method, comprising:
    measuring a current flowing through a power cable;
    determining whether the measured current is greater than a first threshold; and
    generating an adjusted direct current (DC) voltage configured to be provided to the power cable when the measured current exceeds the first threshold based on a safety standard of the power cable, wherein the first threshold is selected at least in part based on one or more safety standards of the power cable.

15. The method of claim 14, wherein generating an adjusted DC voltage further comprises increasing a received DC voltage input to the power cable.

16. The method of claim 14, further comprising providing a DC voltage output based on the adjusted DC voltage to the power cable.

17. The method of claim 14, further comprising sending an alert to one or more systems when the adjusted DC voltage is greater than a second threshold.

18. The method of claim 14, wherein generating an adjusted DC voltage further comprises adjusting the DC voltage based on a temperature of the power cable.

19. The method of claim 14, wherein determining whether the measured current is greater than the first threshold further comprises determining whether the current is within a percentage of a maximum current safety rating of the power cable.

20. The method of claim 17, wherein determining whether the adjusted DC voltage is greater than the second threshold further comprises determining whether the adjusted DC voltage is greater than a safety voltage standard of at least one of the power cable and a radio coupled to the power cable.

* * * * *